US008045513B2

(12) United States Patent
Kim et al.

(10) Patent No.: US 8,045,513 B2
(45) Date of Patent: Oct. 25, 2011

(54) METHOD AND APPARATUS FOR TRANSMITTING AND RECEIVING DOWNLINK CONTROL INFORMATION IN A MOBILE COMMUNICATION SYSTEM SUPPORTING UPLINK PACKET DATA

(75) Inventors: Young-Bum Kim, Seoul (KR); Yong-Jun Kwak, Yongin-si (KR); Ju-Ho Lee, Suwon-si (KR); Youn-Hyoung Heo, Suwon-si (KR); Joon-Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 676 days.

(21) Appl. No.: 11/272,823

(22) Filed: Nov. 15, 2005

(65) Prior Publication Data

US 2006/0104242 A1 May 18, 2006

(30) Foreign Application Priority Data

Nov. 15, 2004 (KR) .......................... 10-2004-0093283
Nov. 16, 2004 (KR) .......................... 10-2004-0093743

(51) Int. Cl.
*H04W 4/00* (2009.01)
(52) U.S. Cl. ........ 370/329; 370/328; 370/468; 370/496; 455/509; 455/522; 714/748
(58) Field of Classification Search .......... 370/310–350, 370/468, 496; 455/509, 522; 714/748
See application file for complete search history.

(56) References Cited

U.S. PATENT DOCUMENTS

| 7,126,928 B2* | 10/2006 | Tiedemann et al. | .......... 370/329 |
| 2003/0219037 A1* | 11/2003 | Toskala et al. | ................ 370/496 |
| 2004/0190485 A1 | 9/2004 | Khan | |
| 2004/0266466 A1 | 12/2004 | Kim et al. | |
| 2005/0047433 A1 | 3/2005 | Rizer et al. | |
| 2006/0056355 A1* | 3/2006 | Love et al. | ..................... 370/332 |

(Continued)

FOREIGN PATENT DOCUMENTS

RU 96117352 A 11/1998

(Continued)

OTHER PUBLICATIONS

"Universal Mobile Telecommunications System (UMTS); FDD Enhanced Uplink; Overall Description; Stage 2 (3GPP TS 25.309, Version 6.2.0, Release 6); ETSI TS 125 309", ETSI Standards, European Telecommunications Standards Institute, Sophia-Antipo, Fr, vol. 3-R2, No. V620, Mar. 2005, XP014027653.

(Continued)

*Primary Examiner* — Jinsong Hu
*Assistant Examiner* — Amancio Gonzalez
(74) *Attorney, Agent, or Firm* — Roylance, Abrams, Berdo & Goodman, L.L.P.

(57) ABSTRACT

A method and apparatus for transmitting and receiving downlink control information in a mobile communication system supporting an uplink packet data service are provided. To transmit packet data in an HARQ mobile communication system, a second transceiver receives an RG as rate control information from a first transceiver. The second transceiver sets the allowed maximum data rate of an HARQ process to which the RG is applied to the allowed maximum data rate of an HARQ process previous to the HARQ process, if the RG indicates hold. The second transceiver transmits packet data within the set allowed maximum data rate to the first transceiver.

32 Claims, 8 Drawing Sheets

U.S. PATENT DOCUMENTS

2006/0098679 A1* 5/2006 Cheng et al. .................. 370/441
2006/0104240 A1* 5/2006 Sebire et al. .................. 370/329

FOREIGN PATENT DOCUMENTS

WO    WO 03/019875 A1    3/2003
WO    WO 03/105370 A1    12/2003

OTHER PUBLICATIONS

Samsung: "T-doc R1-041367, Scheduling per HARQ Process," 3GPP TSG-RAN WG1 Meeting #39, (Online), Nov. 15, 2004-Nov. 19, 2004, XP002454455, Shin-Yokohama, Japan, Retrieved from the Internet: UTL:http://www.3gpp.org/ftp/tsg_ran/WG1_R11/TSGR1_39/Docs/R1-041367.zip>.

Samsung: "T-doc R1-041084, EUL Scheduling: Signaling Support," 3GPP TSG-RAN WG1 Meeting #38bis (Online), Sep. 20, 2004-Sep. 24, 2004, XP002454807, Seoul, South Korea, Retrieved from the Internet: URL:http://www.3gpp.org/ftp/tsg_ran/WG1_RL1/TSGR1_38bis/Docs/R1-041084.zip>.

Ericsson: "T-doc R1-041242, Way Forward on Scheduling Grants," 3GPP TSG-RAN WG1 Meeting #38bis, (Online), Sep. 20-Sep. 24, 2004, XP002454789, Seoul, South Korea, Retrieved from the Internet: URL:http://www.3gpp.org/ftp/tsg_ran/WG1_RL1/TSGR1_38bis//Docs/R1-041242.zip>.

* cited by examiner

METHOD AND APPARATUS FOR TRANSMITTING AND RECEIVING DOWNLINK CONTROL INFORMATION IN A MOBILE COMMUNICATION SYSTEM SUPPORTING UPLINK PACKET DATA

PRIORITY

This application claims priority under 35 U.S.C. §119(a) to an application entitled "Method And Apparatus For Transmitting And Receiving Downlink Control Information In A Mobile Communication System Supporting Uplink Packet Data Service" filed in the Korean Intellectual Property Office on Nov. 15, 2004 and assigned Serial No. 2004-93283 and to an application entitled "Method And Apparatus For Transmitting And Receiving Downlink Control Information In A Mobile Communication System Supporting Uplink Packet Data Service" filed in the Korean Intellectual Property Office on Nov. 16, 2004 and assigned Serial No. 2004-93743, the contents of both of which are hereby incorporated by reference.

BACKGROUND OF THE INVENTION

1. Field of the Invention

The present invention relates generally to a cellular Code Division Multiple Access (CDMA) communication system. More particularly, the present invention relates to a method and apparatus for transmitting and receiving downlink control information in the case where an Enhanced Uplink Dedicated transport CHannel (E-DCH) is used.

2. Description of the Related Art

A $3^{rd}$ generation mobile communication system using WCDMA based on the European Global System for Mobile communications (GSM) system and General Packet Radio Services (GPRS), Universal Mobile Telecommunication Service (UMTS) provides mobile subscribers or computer users with a uniform service of transmitting packet-based text, digitized voice, and video and multimedia data at or above 2 Mbps irrespective of their locations around the world.

In particular, the UMTS system uses a transport channel called the E-DCH in order to further improve the packet transmission performance of uplink communications from a User Equipment (UE) to a Node B (interchangeable with a base station). For more stable high-speed data transmission, Adaptive Modulation and Coding (AMC), Hybrid Automatic Repeat reQuest (HARQ), Node B-controlled scheduling, and shorter Transmission Time Interval (TTI) were introduced for the E-DCH transmission.

AMC is a technique of determining a Modulation and Coding Scheme (MCS) adaptively according to the channel status between the Node B and the UE. Many MCS levels can be defined according to available modulation schemes and coding schemes. The adaptive selection of an MCS level according to the channel status increases resource use efficiency.

HARQ is a packet retransmission scheme for retransmitting a packet to correct errors in an initially transmitted packet. HARQ is branched into Chase Combining (CC) and Incremental Redundancy (IR). The HARQ scheme adopts N-channel Stop and Wait (SAW) to increase data rate. In the N-channel SAW HARQ, a transmitter transmits different data in first to $N^{th}$ Transmission Time Intervals (TTIs), and determines whether to retransmit the data or transmit new data in $(N+1)^{th}$ to $2N^{th}$ TTIs according to Acknowledgement/Non-Acknowledgement (ACK/NACK) received for the transmitted data. N TTIs are processed by separate HARQ processes and each of HARQ processes for the $(N+1)^{th}$ to $2N^{th}$ TTIs is called an $i^{th}$ HARQ process. N is an integer greater than 0 and the HARQ process number i is an integer number ranging from 1 to N.

Node B-controlled scheduling is a scheme in which the Node B determines whether to permit E-DCH transmission for the UE and if it does, an allowed maximum data rate and transmits the determined data rate information as a scheduling grant to the UE, and the UE determines an available E-DCH data rate based on the scheduling grant.

Shorter TTI is a technique for reducing retransmission time delay and thus increasing system throughput by allowing the use of a shorter TTI than the shortest TTI of 10 ms provided by 3GPP Rel5.

Figure 1:
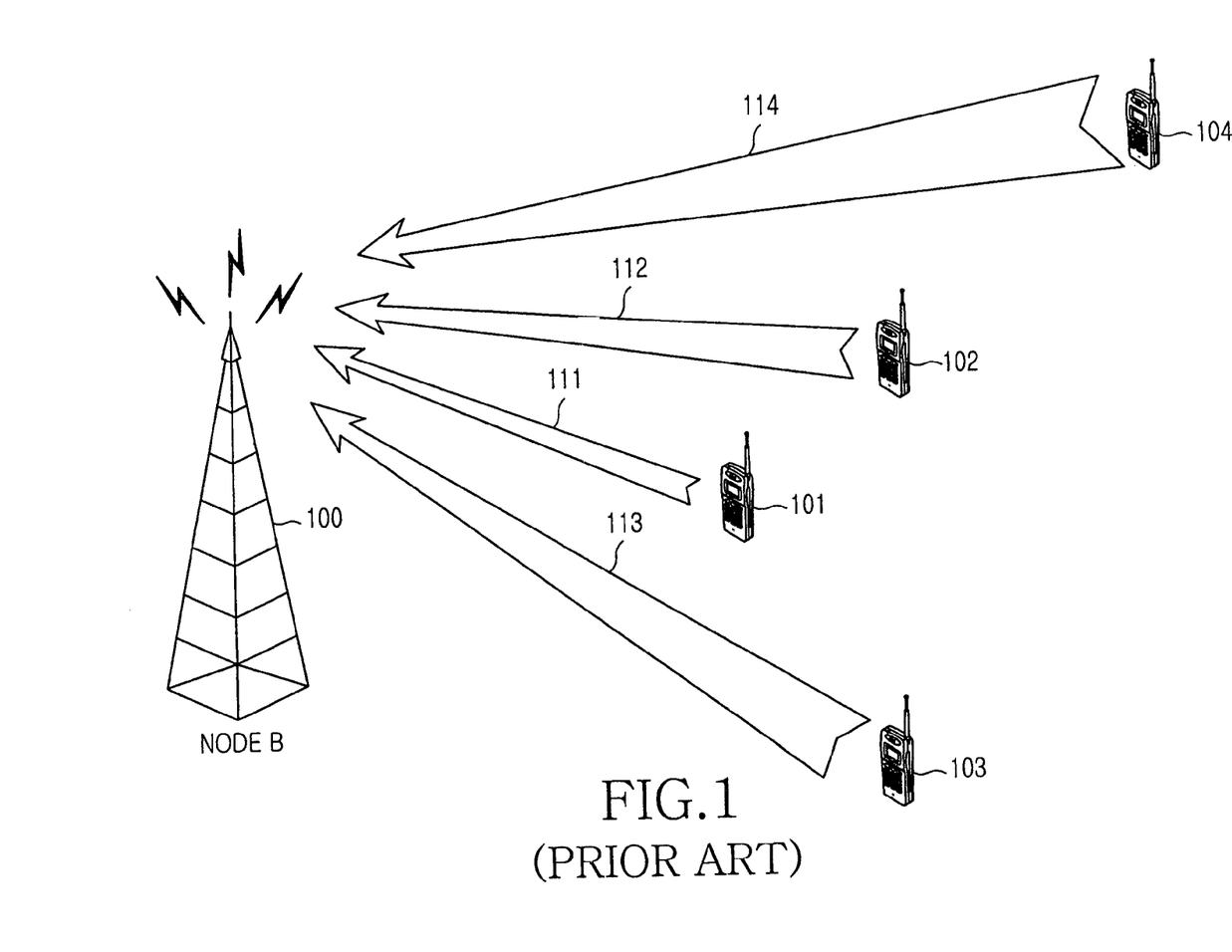
FIG. 1 illustrates uplink packet transmission on the E-DCH in a conventional wireless communication system.

FIG. 1 illustrates uplink packet transmission on the E-DCH in a typical wireless communication system.

Referring to FIG. 1, reference numeral 100 denotes a Node B supporting the E-DCH and reference numerals 101 to 104 denote UEs using the E-DCH. As illustrated, the UEs 101 to 104 transmit data to the Node B 100 on E-DCHs 111 to 114.

The Node B 100 notifies the individual UEs 101 to 104 whether they are permitted for E-DCH transmission or transmits to the UEs scheduling grants indicating E-DCH data rates for them, based on information about buffer occupancy and requested data rates or channel status information received from the UEs. This operation is called scheduling of uplink data transmission. The scheduling is performed such that the noise rise or Rise over Thermal (ROT) measurement of the Node B does not exceed a target ROT to increase total system performance by, for example, allocating low data rates to remote UEs (such as the UEs 103 and 104) and high data rates to nearby UEs (such as the UEs 101 and 102). The UEs 101 to 104 determine their allowed maximum data rates for E-DCH data based on the scheduling grants and transmit the E-DCH data at the determined data rates.

Due to asynchronization between uplink signals from different UEs, the uplink signals interfere with one another. As the Node B receives more uplink signals, an uplink signal from a particular UE suffers from increased interference, thereby decreasing reception performance in the Node B. This problem can be overcome by increasing the uplink transmit power of the UE, but the increased transmit power in turn serves as interference to other uplink signals. Thus, the reception performance is still decreased in the Node B. The total power of uplink signals that the Node B can receive with reception performance at or above an acceptable level is limited. ROT represents uplink radio resources used by the Node B, defined as $$ROT=I_o/N_o \qquad (1)$$

where $I_o$ denotes power spectral density over a total reception band, that is, the total amount of uplink signals received in the Node B, and $N_o$ denotes the thermal noise power spectral density of the Node B. Therefore, an allowed maximum ROT is total uplink radio resources available to the Node B.

The total ROT is expressed as the sum of inter-cell interference, voice traffic and E-DCH traffic. With Node B-controlled scheduling, simultaneous transmission of packets from a plurality of UEs at high data rates is prevented, maintaining the total ROT at or below a target ROT and thus ensuring reception performance all the time. When high data rates are allowed for particular UEs, they are not allowed for other UEs in the Node B-controlled scheduling. Consequently, the total ROT does not exceed the target ROT.

Figure 2:
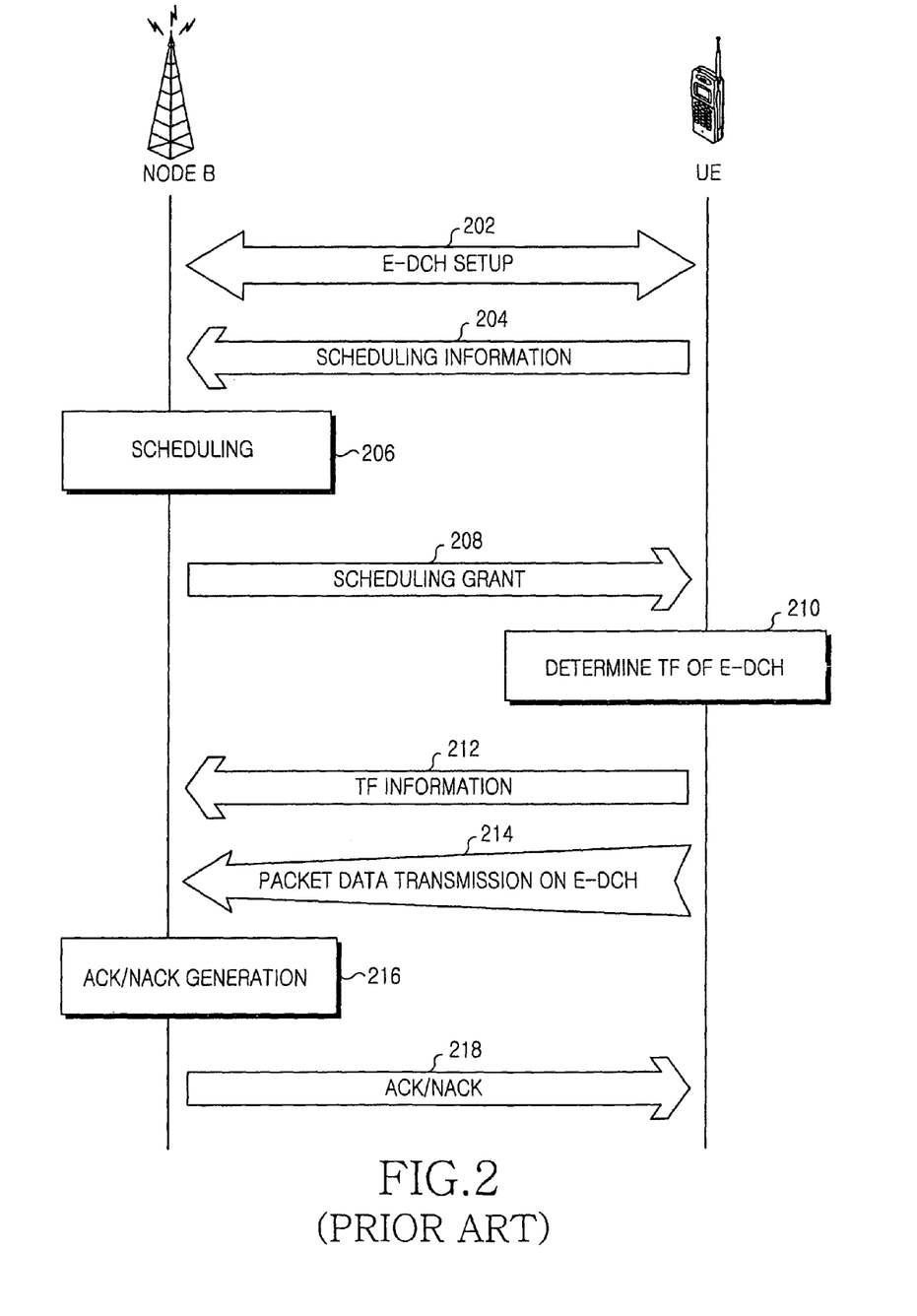
FIG. 2 is a diagram illustrating a conventional signal flow for message transmission and reception on the E-DCH.

FIG. 2 is a diagram illustrating a typical signal flow for message transmission and reception on the E-DCH.

Referring to FIG. 2, a Node B and a UE establish an E-DCH in step 202. Step 202 involves message transmission on dedicated transport channels. The UE transmits scheduling information to the Node B in step 204. The scheduling information may contain uplink channel status information including the transmit power and power margin of the UE, and the amount of buffered data to be transmitted to the Node B.

In step 206, the Node B monitors scheduling information from a plurality of UEs to schedule uplink data transmissions for the individual UEs. The Node B decides to approve an uplink packet transmission from the UE and transmits a scheduling grant to the UE in step 208. The scheduling grant indicates up/hold/down in an allowed maximum data rate, or an allowed maximum data rate and an allowed transmission timing.

In step 210, the UE determines the TF of the E-DCH based on the scheduling grant. The UE then transmits TF information to the Node B, and uplink packet data on the E-DCH at the same time in steps 212 and 214. The TF information includes a Transport Format Resource Indicator (TFRI) indicating resources required for E-DCH demodulation. The UE selects an MCS level according to an allowed maximum data rate set by the Node B and its channel status, and transmits the E-DCH data in step 214.

The Node B determines whether the TF information and the uplink packet data have errors in step 216. In the presence of errors in either of the TF information and the uplink packet data, the Node B transmits a NACK signal to the UE on an ACK/NACK channel, whereas in the absence of errors in both, the Node B transmits an ACK signal to the UE on the ACK/NACK channel in step 218. In the latter case, the packet data transmission is completed and the UE transmits new packet data to the Node B on the E-DCH. On the other hand, in the former case, the UE retransmits the same packet data to the Node B on the E-DCH.

Under the above-described environment, if the Node B can receive from the UE scheduling information including, for example, information about the buffer occupancy and power status of the UE, it allocates a low data rate to the UE if it is far from the Node B, is in a bad channel status, or has data of a lower service class. If the UE is near to the Node B, is in a good channel status, or has data of a higher service class, the Node B allocates a high data rate to the UE. Therefore, the total system performance is increased.

In the case where the Node B transmits a Relative Grant (RG) indicating up/hold/down in the allowed maximum data rate of the UE as a scheduling grant for the E-DCH, the signaling overhead of the RG reduces downlink capacity. Accordingly, a need exists for a method of reducing downlink signaling overhead arising from transmitting a scheduling grant in Node B-controlled scheduling.

SUMMARY OF THE INVENTION

An object of embodiments of the present invention is to substantially solve at least the above described problems and/or disadvantages and to provide at least the advantages described below. Accordingly, embodiments of the present invention provide a method and apparatus for reducing downlink signaling overhead arising from transmitting a scheduling grant by which a Node B controls the uplink data rate of a UE in a situation where Node B-controlled scheduling and HARQ are used in an E-DCH-supporting mobile communication system.

Embodiments of the present invention also provide a method and apparatus for effectively interpreting a scheduling grant that a Node B transmits to control the uplink data rate of a UE in a situation where Node B-controlled scheduling and HARQ are used in an E-DCH-supporting mobile communication system.

The above objects are substantially achieved by providing a method and apparatus for transmitting and receiving downlink control information in a mobile communication system supporting an uplink packet data service.

According to one aspect of the present invention, in a method of transmitting packet data in an HARQ mobile communication system, a second transceiver receives an RG as rate control information from a first transceiver. The second transceiver sets the allowed maximum data rate of an HARQ process to which the RG is applied to the allowed maximum data rate of an HARQ process previous to the HARQ process, if the RG indicates hold. The second transceiver transmits packet data within the set allowed maximum data rate to the first transceiver.

According to another aspect of the present invention, in a method of transmitting control information for packet data reception in an HARQ mobile communication system, a first transceiver determines an allowed maximum data rate for a predetermined HARQ process for a second transceiver, and sets an RG as rate control information to hold if the determined allowed maximum data rate is equal to an allowed maximum data rate of an HARQ process previous to the predetermined HARQ process. The first transceiver then transmits the RG to the second transceiver.

According to a further aspect of the present invention, in an apparatus for transmitting packet data in an HARQ mobile communication system, a radio signal receiver despreads a signal received from a first transceiver with an allocated common channelization code. An RG signaling interpreter detects an RG as rate control information from the despread signal, and sets the allowed maximum data rate of an HARQ process to which the RG is applied to the allowed maximum data rate of an HARQ process previous to the HARQ process, if the RG indicates hold.

According to still another aspect of the present invention, in an apparatus for transmitting control information for packet data reception in an HARQ mobile communication system, a Node B scheduler determines an allowed maximum data rate for a predetermined HARQ process for a second transceiver. An RG signaling generator sets an RG as rate control information to hold if the determined allowed maximum data rate is equal to an allowed maximum data rate of an HARQ process previous to the predetermined HARQ process. A radio signal transmitter transmits the RG to the second transceiver.

BRIEF DESCRIPTION OF THE DRAWINGS

The above and other objects, features and advantages of embodiments of the present invention will become more apparent from the following detailed description when taken in conjunction with the accompanying drawings in which.

Throughout the drawings, like reference numbers should be understood to refer to like elements, features and structures.

DETAILED DESCRIPTION OF EXEMPLARY EMBODIMENTS

Exemplary embodiments of the present invention will be described herein below with reference to the accompanying drawings. In the following description, detailed descriptions of well-known functions or constructions are omitted for clarity and conciseness.

The following description of exemplary embodiments of the present invention is made in the context of the E-DCH in a UMTS system.

Node B-controlled scheduling is a technique of improving system throughput and coverage by efficient control of uplink ROT in a Node B. For this purpose, the Node B controls the E-DCH data rate of each UE. An E-DCH data rate refers to the power ratio of a physical channel to which the E-DCH is mapped to a reference physical channel whose power is controlled. The E-DCH data rate is equivalent to an E-DCH TF or E-DCH transmit power. That is, for a high E-DCH data rate, more power is allocated to the E-DCH.

The Node B-controlled scheduling can be considered in three ways. One way is to increase or decrease the allowed maximum data rate of a UE by a predetermined increment or decrement, or hold the allowed maximum data rate. The UE is able to transmit data in each TTI and the Node B signals to the UE an RG indicating up/hold/down in the allowed maximum data rate instead of an Absolute Grant (AG) indicating the absolute value of a specific allowed maximum data rate. Typically, the RG is a 1-bit information that can be set to +1/0/−1 indicating up/hold/down. If the RG is 0, no signal is transmitted, that is, it indicates a Discontinuous Transmission (DTX). The increment or decrement is predetermined and thus the change of a data rate that the Node B can control for the UE at one time instant is limited to the increment or decrement.

A second way is to signal an AG directly indicating the absolute value of an allowed maximum data rate and a transmission timing for the UE.

A third way is to signal an RG and an AG in combination.

Considering that HARQ is applied to the E-DCH, the relationship between the HARQ and the Node B-controlled scheduling will be described bow. In an exemplary embodiment of the present invention, an N-channel SAW HARQ scheme is taken. According to the N-channel SAW HARQ, a transmitter transmits different data in first through $N^{th}$ TTIs and determines whether to transmit new data or retransmit the transmitted data in $(N+1)^{th}$ to $2N^{th}$ TTIs depending on ACK/NACK signals received for the transmitted data. The exemplary embodiment of the present invention is based on the assumption that the Node B signals an RG in the Node B-controlled scheduling, the UE uses a 2 ms E-DCH TTI, and five HARQ processes are defined. Thus, HARQ process numbers are repeated every five 2 ms TTIs in the order of 1, 2, 3, 4, 5, 1, 2, 3, 4, 5, . . . and so on. The value of an RG applies to the same process number. For instance, if the RG indicates "up" for HARQ process #2, the UE is supposed to increase an allowed maximum data rate applied to the latest HARQ process #2 by a predetermined level.

From the perspective of downlink signaling overhead, it may occur that a Node B scheduler transmits to a UE the same RG, for example, of +1 (up) successively for HARQ process #1 to HARQ process #5 according to the ROT of the cell and the channel status of the UE in an E-DCH system where five HARQ processes are defined for 2 ms TTIs. If the UE can find out the RGs for HARQ processes #2 through #5 from the RG for HARQ process #1, the downlink signaling overhead of transmitting the RGs is reduced by a factor of five (one RG rather than five). In this context, exemplary embodiments of the present invention provide operations of the Node B and the UE to reduce signaling overhead for the case where the same scheduling grant is repeated for a plurality of HARQ processes.

In accordance with an exemplary embodiment of the present invention, a reference RG for a reference HARQ process (RG_reference) and a non-reference RG for a non-reference HARQ process (RG_non_reference) are generated separately to reduce downlink signaling overhead. The reference HARQ process is notified by upper layer signaling or is fixed.

Given five HARQ processes, #1 through #5, HARQ process #1 is set as a reference HARQ process and the other HARQ processes are set to non-reference HARQ processes, for example. If the RG_non_reference is identical to the RG_reference, the RG_non_reference is not signaled, thereby reducing the signaling overhead. For this purpose, the Node B and the UE make a distinction between the RG_reference and the RG_non_reference in generation and interpretation. To increase the reliability of transmission of the RG_reference, the RG_reference is sent with higher power than the RG_non_reference.

Embodiment 1

Figure 3:
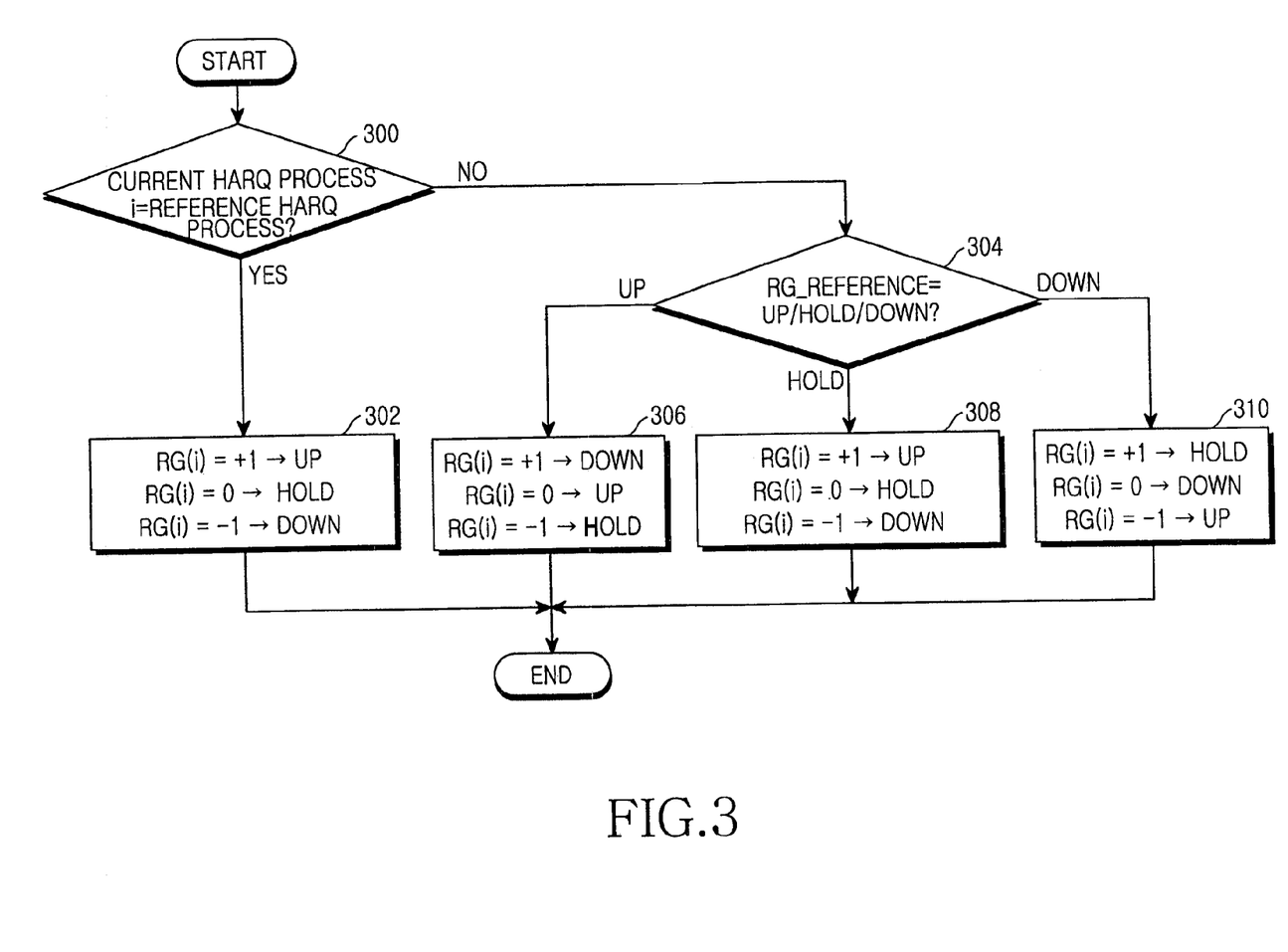
FIG. 3 is a flowchart illustrating an operation for generating and interpreting a scheduling grant according to an exemplary embodiment of the present invention.

FIG. 3 is a flowchart illustrating an operation for generating and interpreting a scheduling grant according to an exemplary embodiment of the present invention.

Referring to FIG. 3, the Node B determines whether an HARQ process for which to allocate a data rate is a reference HARQ process in step 300. The HARQ process for which to allocate a data rate is an HARQ process to be allocated to a current TTI and it is referred to as "a current HARQ process". If the current HARQ process is a reference HARQ process, the Node B sets an RG to +1 for a rate increase, 0 (that is, DTX) for no rate change, or −1 for a rate decrease for the reference HARQ process according to scheduling in the Node B scheduler in step 302. Since the RG received from the Node B is intended for the reference HARQ process, the UE interprets an RG of +1 as a rate increase, an RG of 0 as no rate change, and an RG of −1 as a rate decrease.

On the other hand, if the current HARQ process is a non-reference HARQ process in step 300, the Node B determines whether an RG_reference indicates up, hold or down in step 304. If the RG_reference indicates up, the Node B sets an RG_non_reference for the current HARQ process to 0 (that is, DTX) for a rate increase, −1 for no rate change, or +1 for a rate decrease according to scheduling in the Node B scheduler in step 306.

Since the RG received from the Node B is intended for the non-reference HARQ process and the previously received RG_reference indicates up, the UE interprets an RG of +1 as a rate decrease, an RG of 0 as a rate increase, and an RG of −1 as no rate change.

If the RG_reference indicates hold in step 304, the Node B sets the RG_non_reference for the current HARQ process to +1 for a rate increase, 0 (that is, DTX) for no rate change, or −1 for a rate decrease according to scheduling in the Node B scheduler in step 308. Since the RG received from the Node B is intended for the non-reference HARQ process and the RG_reference indicates hold, the UE interprets an RG of +1 as a rate increase, an RG of 0 as no rate change, and an RG of −1 as a rate decrease.

If the RG_reference indicates down in step 304, the Node B sets the RG_non_reference for the current HARQ process to −1 for a rate increase, +1 for no rate change, or 0 (that is, DTX) for a rate decrease according to scheduling in the Node B scheduler in step 310. Since the RG received from the Node B is intended for the non-reference HARQ process and the RG_reference indicates down, the UE interprets an RG of +1 as no rate change, an RG of 0 as a rate decrease, and an RG of −1 as a rate increase.

In this manner, if the Node B intends to transmit an RG_non_reference identical to an RG_reference, it sets a DTX mode for a corresponding non-reference HARQ process, thereby reducing signaling overhead.

The above-described operation will be described in great detail with reference to Table 1 and Table 2.

In Table 1 below, RG_reference values are mapped to ID_RG_reference values to have predetermined meanings. For an RG_reference of +1, the ID_RG_reference is 2, indicating an increase in the allowed maximum data rate of a UE. For an RG_reference of 0, the ID_RG_reference is 1, indicating no change in the allowed maximum data rate. For an RG_reference of −1, the ID_RG_reference is 0, indicating a decrease in the allowed maximum data rate. The Node B and the UE generate and interpret RG_reference values according to Table 1.

TABLE 1

| RG_reference | ID_RG_reference | Meaning |
| --- | --- | --- |
| +1 | 2 | Up |
| 0 | 1 | Hold |
| −1 | 0 | Down |

Generation and interpretation of an RG_non_reference can be expressed as the following function of the RG_non_reference described in Table 2 below.

TABLE 2

| RG_non_reference | ID_RG_non_reference |
| --- | --- |
| +1 | (ID_RG_non_reference + 1) mod 3 |
| 0 | ID_RG_non_reference mod 3 |
| −1 | (ID_RG_non_reference − 1) mod 3 |

In Table 2, mod represents a modulo operation. "x mod y" equals the remainder of dividing x by y. As used herein, the modulo function results in an output ranging from 0 to |y−1| (a positive result). For instance, "1 mod 3=1" (three goes into one zero times, and leaves a remainder of one) and "−1 mod 3=2" (three goes into negative one negative one times, and leaves a remainder of two). The Node B and the UE generate and interpret an RG_non_reference by calculating an ID_RG_non_reference according to Table 2 and detecting an ID_RG_reference having the same value as the calculated ID_RG_non_reference in Table 1.

For notational simplicity, five HARQ processes are defined, #1 through #5, and HARQ process #1 is set as a reference HARQ process.

In the case where the Node B signals an RG of +1 for the reference HARQ process #1 to command an increase in the allowed maximum data rate of the UE (RG_reference=+1 and ID_RG_reference=2), if it then signals an RG of +1 for HARQ process #2 (RG_non_reference=+1), an ID_RG_non_reference for HARQ process #2=(ID_RG_reference+1 mod 3=(2+1) mod 3=0. Therefore, looking an ID_RG_reference of 0 up to Table 1, the UE interprets the RG_non_reference as indicating a rate decrease. Thus, from the Node B's point of view, when commanding a rate decrease for HARQ process #2, the Node B signals an RG_non_reference set to 1.

If the Node B signals an RG of 0 for HARQ process #2 (RG_non reference=0), the ID_RG_non_reference=ID_RG_reference mod 3=2 mod 3=2. Therefore, looking an ID_RG_reference of 2 up to Table 1, the UE interprets the RG_non_reference as indicating a rate increase. Thus, from the Node B's point of view, when commanding a rate increase for HARQ process #2, the Node B signals an RG_non_reference set to 0. If the Node B signals an RG of −1 for HARQ process #2 (RG_non_reference=−1), the ID_RG_non_reference=(ID_RG_reference−1) mod 3=(2−1) mod 3=1. Therefore, looking an ID_RG_reference of 1 up to Table 1, the UE interprets the RG_non_reference as indicating no rate change. Thus, from the Node B's point of view, when commanding no rate change for HARQ process #2, the Node B signals an RG_non_reference set to −1. In this way, the Node B and the UE generate and interpret RGs (RG_non_reference and RG_reference) until before the next reference HARQ process, that is, to HARQ process #5.

In the case where the Node B signals an RG of 0 (that is, DTX) for the reference HARQ process # 1 to command no rate change in the allowed maximum data rate of the UE (RG_reference=0 and ID_RG_reference=1), if it then signals an RG of +1 for HARQ process #2 (RG_non_reference=+1), the ID_RG_non_reference for HARQ process #2= (ID_RG_reference+1 mod 3=(1+1) mod 3=2. Therefore, looking an ID_RG_reference of 2 up to Table 1, the UE interprets the RG_non_reference as indicating a rate increase. Thus, from the Node B's point of view, when commanding a rate increase for HARQ process #2, the Node B signals an RG_non_reference set to +1.

If the Node B signals an RG of 0 for HARQ process #2 (RG_non_reference=0, that is, DTX), the ID_RG_non_reference=ID_RG_reference mod 3=1 mod 3=1. Therefore, looking an ID_RG_reference of 1 up to Table 1, the UE interprets the RG_non_reference as indicating no rate change. Thus, from the Node B's point of view, when commanding no rate change for HARQ process #2, the Node B does not signal an RG in the DTX mode. If the Node B signals an RG of −1 for HARQ process #2 (RG_non_reference=−1), the ID_RG_non_reference=(ID_RG_reference−1) mod 3=(1−1) mod 3=0. Therefore, looking an ID_RG-_reference of 0 up to Table 1, the UE interprets the RG_non_reference as indicating a rate decrease. Thus, from the Node B's point of view, when commanding a rate decrease for HARQ process #2, the Node B signals an RG_non_reference set to −1. In this way, the Node B and the UE generate and interpret RGs (RG_non_reference and RG_reference) until before the next reference HARQ process, that is, to HARQ process #5.

In the case where the Node B signals an RG of −1 for the reference HARQ process #1 to command a rate decrease in the allowed maximum data rate of the UE (RG_reference=−1 and ID_RG_reference=0), if it then signals an RG of +1 for HARQ process #2 (RG_non_reference=+1), the ID_RG_non_reference for HARQ process #2=(ID_RG_reference+1) mod 3=(0+1) mod 3=1. Therefore, looking an ID_RG_reference of 1 up to Table 1, the UE interprets the RG_non_reference as indicating no rate change. Thus, from the Node B's point of view, when commanding no rate change for HARQ process #2, the Node B signals an RG_non_reference set to +1.

If the Node B signals an RG of 0 for HARQ process #2 (RG_non_reference=0, that is DTX), the ID_RG_non_reference=ID_RG_reference mod 3=0 mod 3=0. Therefore, looking an ID RG_reference of 0 up to Table 1, the UE interprets the RG_non_reference as indicating a rate decrease. Thus, from the Node B's point of view, when commanding a rate decrease for HARQ process #2, the Node B does not signal an RG in the DTX mode. If the Node B signals an RG of −1 for HARQ process #2 (RG_non_reference=−1), the ID_RG_non_reference=(ID_RG_reference−1) mod 3=(0−1) mod 3=2. Therefore, looking an ID_RG_reference of 2 up to Table 1, the UE interprets the RG_non_reference as indicating a rate increase. Thus, from the Node B's point of view, when commanding a rate increase for HARQ process #2, the Node B signals an RG_non_reference set to −1.

In this way, the Node B and the E: generate and interpret RGs until before the next reference HARQ process, that is, until HARQ process #5.

Table 3 summarizes RGs (RG_reference and RG_non_reference) for HARQ processes, set by the Node B.

reliability of RG_reference, an RG gain for a reference HARQ process can be set to be higher by a predetermined offset. In this case, the RG gain for the reference HARQ process is notified by upper layer signaling or preset.

Figure 4:
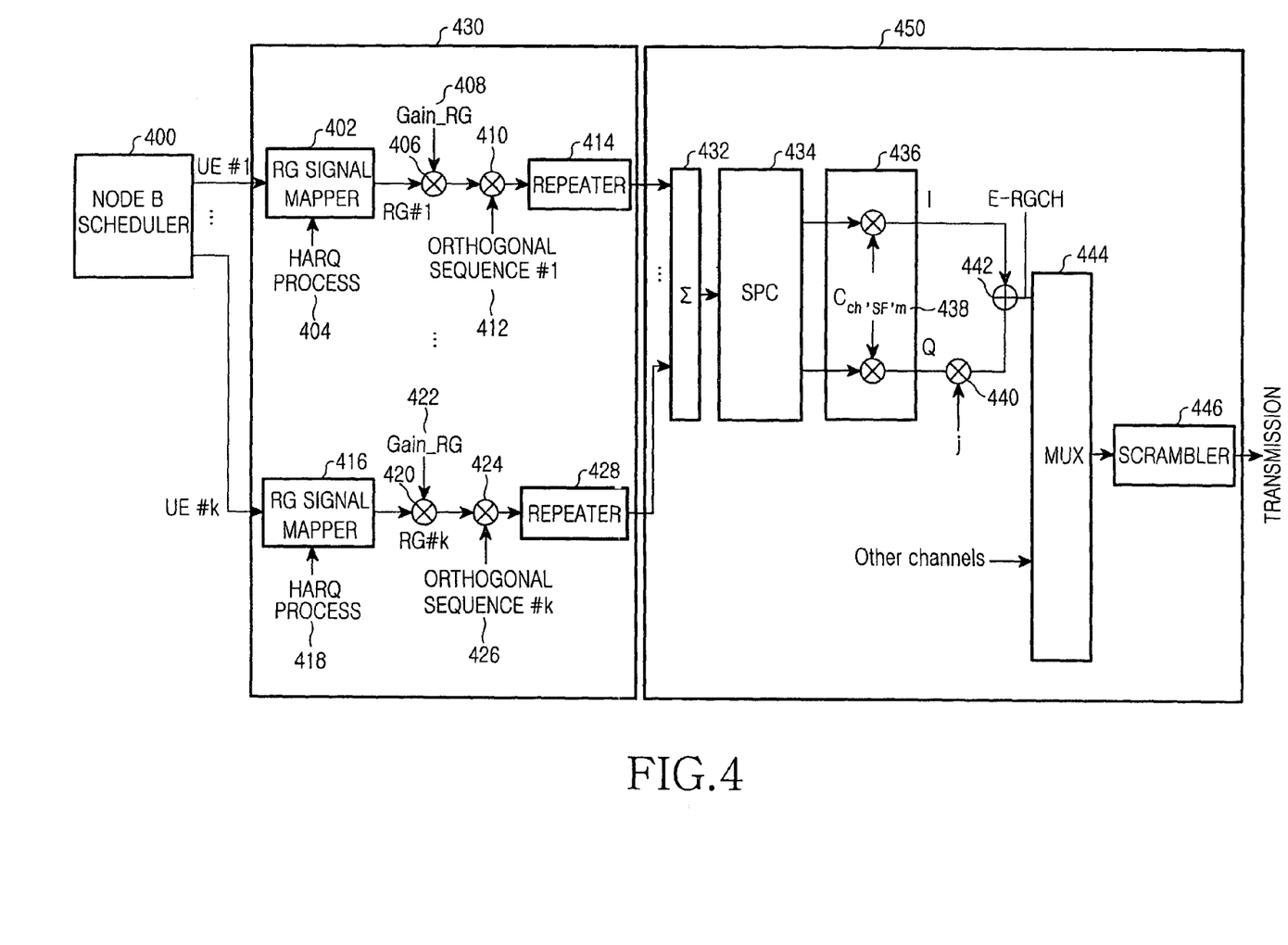
FIG. 4 is a block diagram of a Node B transmitter according to an exemplary embodiment of the present invention.

The power-controlled RGs are spread with orthogonal sequences 412 to 426 allocated to the respective UEs to identify them in spreaders 410 to 424 and repeated to a TTI length in repeaters 414 to 428. The repeated RGs for all UEs are summed in the first summer 432 and converted to parallel signals in a serial-to-parallel converter (SPC) 434. A channel spreader 436 spreads the parallel signals with a common channelization code $C_{ch,SF,m}$ 438 allocated to the E-RGCH at a chip level. Among the chip level-spread signals, a Q-branch signal is phase-shifted by 90 degrees in a phase rotator 440 and then added to an I-branch signal in a second summer 442. A multiplexer (MUX) 444 multiplexes the sum signal with other channel signals and a scrambler 446 scrambles the multiplexed signal, prior to transmission to the UEs.

Figure 5:
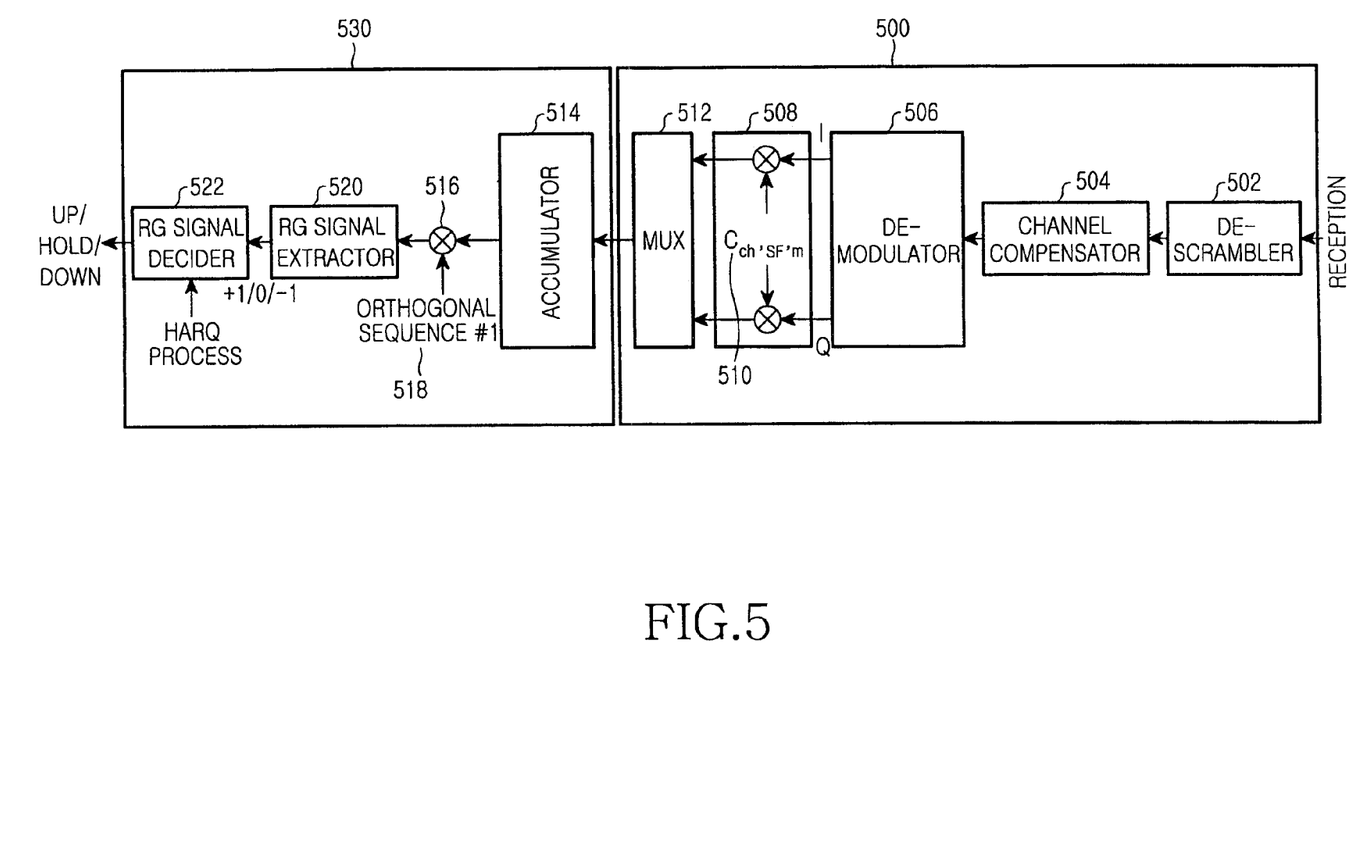
FIG. 5 is a block diagram of a UE receiver according to an exemplary embodiment of the present invention.

FIG. 5 is a block diagram of a UE receiver according to an exemplary embodiment of the present invention.

For conciseness, channels other than the common code channel for carrying an RG are not shown. In the illustrated case of FIG. 5, a receiver in an arbitrary UE, UE #1 among k UEs mentioned with reference to FIG. 4 is shown.

Referring to FIG. 5, the UE receiver is essentially-divided into a radio signal receiver 500 and an RG signaling interpreter 530. The radio signal receiver 500 includes a descrambler 502 through a MUX 512, and the RG signaling interpreter 530 includes an accumulator 514 through an RG signal decider 522.

TABLE 3

| | | RG_non_reference | | |
| control | RG_reference | When RG_reference = 1 | When RG_reference = 0 | When RG_reference = −1 |
|---|---|---|---|---|
| Up | +1 | 0 | +1 | +1 |
| Hold | 0 | −1 | 0 | −1 |
| Down | −1 | +1 | −1 | 0 |

FIG. 4 is a block diagram of a Node B transmitter according to an exemplary embodiment of the present invention.

For conciseness, channels other than a common code channel for carrying an RG (RG_reference or RG_non_reference) are not shown. The Node B transmits k RGs to k UEs on one common code channel using a total of k orthogonal sequences. The orthogonal sequences can be, for example, Hadamard sequences.

Referring to FIG. 4, the Node B transmitter is essentially divided into an RG signaling generator 430 and a radio signal transmitter 450. The RG signal generator 430 includes RG signaling mappers 402 to 416 through repeaters 414 to 428. The radio signal transmitter 450 includes a first summer 432 through a scrambler 446.

In operation, a Node B scheduler 400 generates an RG command (up/hold/down) for each UE taking into account the ROT of the cell and a resource allocation request from the UE. The RG signaling mappers 402 to 416 map RG commands received from the Node B scheduler 400 to RG signals according to the rule described as Table 3, taking into account HARQ process numbers to which the RG commands are applied. Gain controllers 406 to 420 adjust transmit power with appropriate RG gains 408 to 422, Gain_RG for the UEs, for reliable RG transmission. To increase the transmission In operation, a received signal is descrambled in the descrambler 502, channel-compensated in a channel compensator 504, and separated into an I-branch signal and a Q-branch signal in a Quadrature Phase Shift Keying (QPSK) demodulator 506. The I-branch and Q-branch signals are despread with a common channelization code $C_{ch,SF,m}$ 510 allocated to the E-RGCH in a despreader 508, multiplexed in a MUX 512, and accumulated as many times as repeated in the repeaters 414 to 428 in an accumulator 514. The common channelization code $C_{ch,SF,m}$ 510 is notified to the UE by a Radio Network Controller (RNC). The accumulated signal lasts the duration of one slot. A correlator 516 correlates the accumulated signal with an orthogonal code 518, orthogonal code #1 allocated to the UE. An RG signal extractor 520 compares the correlation with a predetermined threshold and outputs an RG signal set to one of +1, 0 and −1. The RG signal decider 522 interprets the RG signal taking into account the RG signal and the number of a current HARQ process number. Specifically, the RG signal decider 522 interprets the RG signal according to Table 1 if a current HARQ process is a reference HARQ process, and according to Table 2 if the current HARQ process is a non-reference HARQ process.

While not shown, an E-DCH transmitter transmits uplink data within an allowed maximum data rate updated according to the interpreted RG signal.

Embodiment 2

Figure 6:
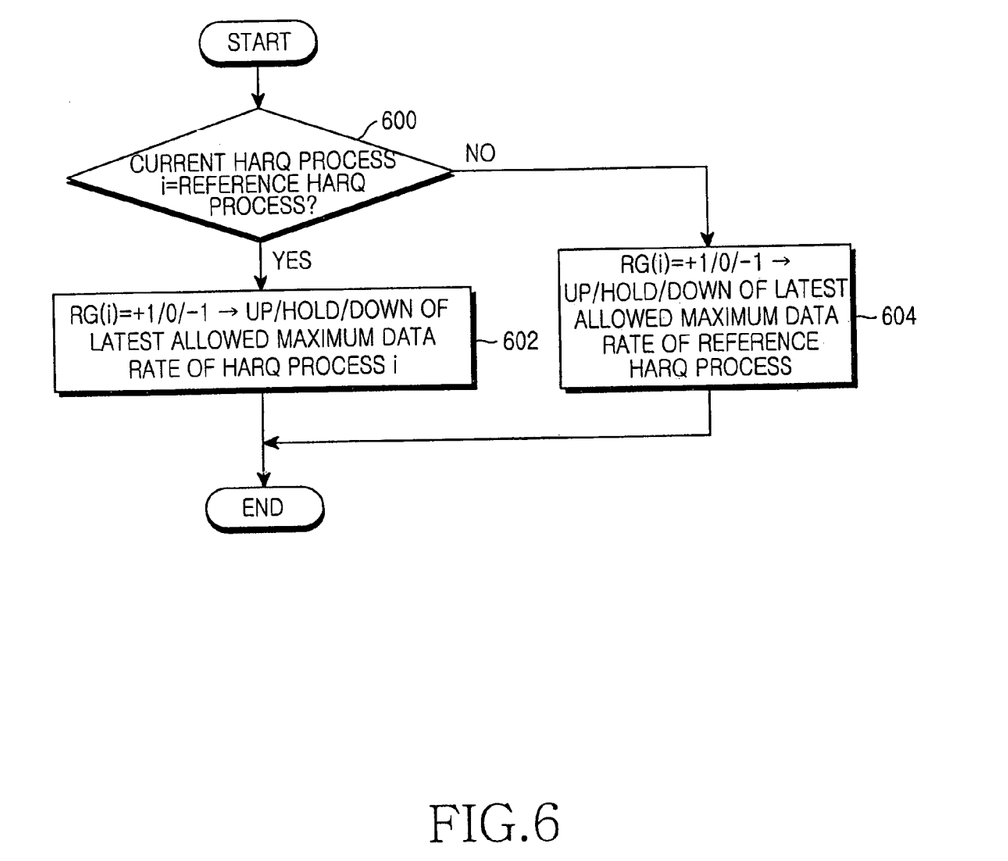
FIG. 6 is a flowchart illustrating an operation for generating and interpreting a scheduling grant according to an exemplary embodiment of the present invention.

FIG. 6 is a flowchart illustrating an exemplary operation for generating and interpreting a scheduling grant according to an embodiment of the present invention.

Typically, an up/hold/down command indicated by an RG applied to the same HARQ process number. For instance, if the Node B signals an RG indicating up for HARQ process #2, the UE is supposed to increase an allowed maximum data rate applied to the latest HARQ process #2 by a predetermined level.

Referring to FIG. 6, the Node B determines whether a current HARQ process to which a data rate is to be allocated is a reference HARQ process in step 600. In the case of a reference HARQ process, the Node B determines up/hold/down for the reference HARQ process with respect to the allowed maximum data rate of the latest HARQ process in step 602. On the other hand, in the case of a non-reference HARQ process, the Node B determines up/hold/down for the non-reference HARQ process with respect to the allowed maximum data rate of the reference HARQ process in step 604. Since high reliability is required for RG_reference, RG_reference is preferably transmitted at a higher transmit power level than RG_non_reference. A transmit power adjustment value (Gain_RG) for the reference HARQ process is notified by upper signaling or preset.

In accordance with this embodiment of the present invention, a Node B transmitter and a UE receiver are substantially identical to those illustrated in FIGS. 4 and 5 in terms of configuration and operation, except for RG generation and interpretation based on the above-described rule illustrated in FIG. 6.

Embodiment 3

Figure 7:
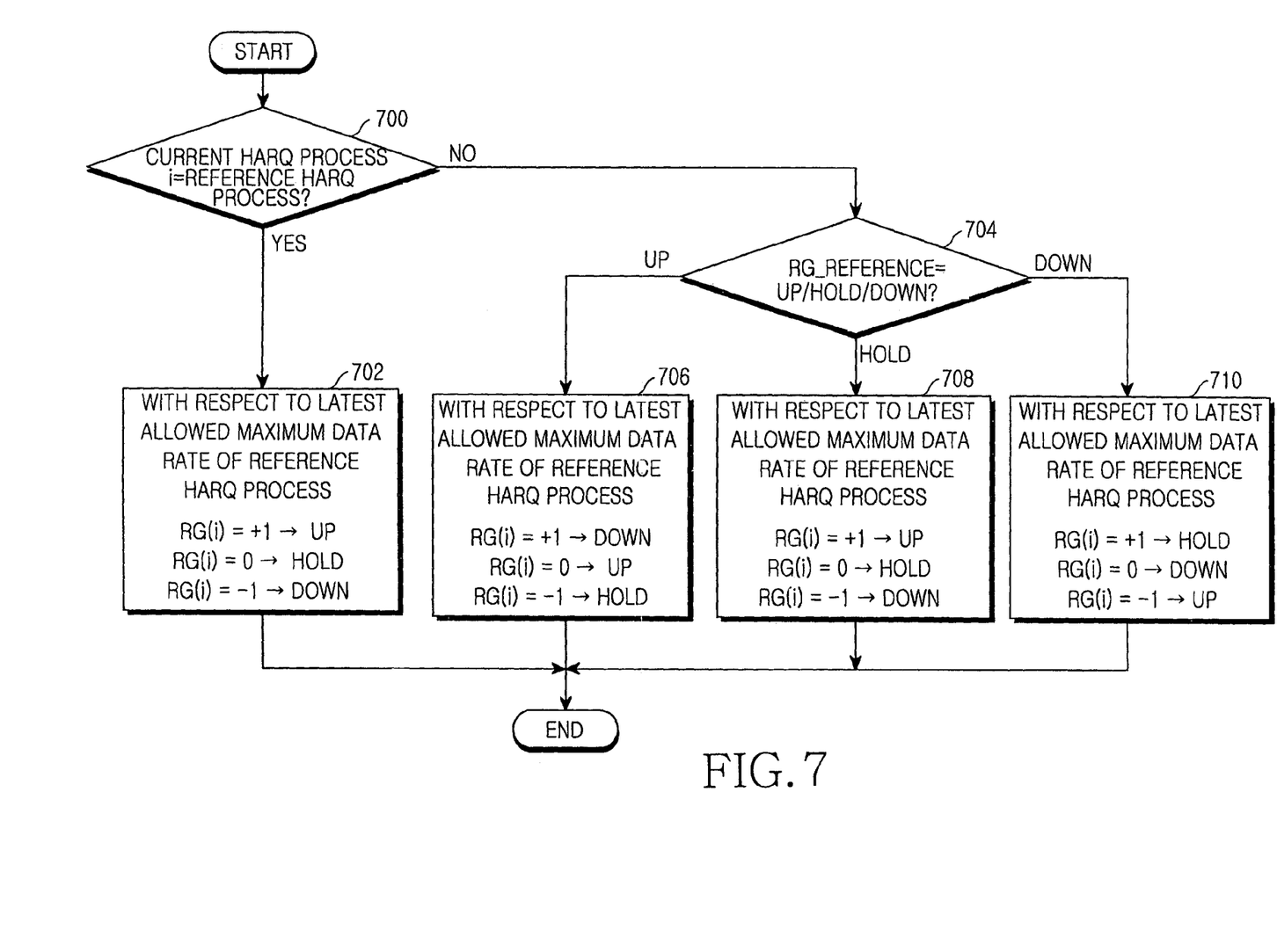
FIG. 7 is a flowchart illustrating an operation for generating and interpreting a scheduling grant according to an exemplary embodiment of the present invention.

FIG. 7 is a flowchart illustrating an operation for generating and interpreting a scheduling grant according to another exemplary embodiment of the present invention.

Referring to FIG. 7, the Node. B determines whether a current HARQ process for which to allocate a data rate is a reference HARQ process in step 700. If the current HARQ process is a reference one, the Node B determines an RG value of up/hold/down with respect to the latest allowed maximum data rate of the reference HARQ process for the UE in step 702. On the other hand, if the current HARQ process is a non-reference one in step 700, the Node B determines whether the latest RG of the reference HARQ process indicates up/hold/down in step 704.

If the RG_reference indicates up, the Node B compares the allowed maximum data rate of the non-HARQ process with the latest allowed maximum data rate of the reference HARQ process in step 706. For a rate increase from the latest allowed maximum data rate of the reference HARQ process, the Node B sets an RG_non_reference for the current HARQ process to 0 that is, DTX), −1 for no rate change, or +1 for a rate decrease. Since the RG received from the Node B is intended for the non-reference HARQ process and the previously received RG_reference indicates up, the UE interprets an RG of +1 as a rate decrease, an RG of 0 as a rate increase, and an RG of −1 as no rate change.

If the RG_reference indicates hold in step 704, the Node B compares the allowed maximum data rate of the non-HARQ process with the latest allowed maximum data rate of the reference HARQ process in step 708. For a rate increase from the latest allowed maximum data rate of the reference HARQ process, the Node B sets the RG_non_reference for the current HARQ process to +1, 0 (that is, DTX) for no rate change, or −1 for a rate decrease. Since the RG received from the Node B is intended for the non-reference HARQ process and the RG_reference indicates hold, the UE interprets an RG of +1 as a rate increase, an RG of 0 as no rate change, and an RG of −1 as a rate decrease.

If the RG_reference indicates down in step 704, the Node B compares the allowed maximum data rate of the non-HARQ process with the latest allowed maximum data rate of the reference HARQ process in step 710. For a rate increase from the latest allowed maximum data rate of the reference HARQ process, the Node B sets the RG_non_reference for the current HARQ process to −1, +1 for no rate change, or 0 (that is, DTX) for a rate decrease. Since the RG received from the Node B is intended for the non-reference HARQ process and the RG_reference indicates down, the UE interprets an RG of +1 as no rate change, an RG of 0 as a rate decrease, and an RG of −1 as a rate increase.

In this way, if the Node B intends to transmit an RG_non_reference identical to an RG_reference, it sets a DTX mode for a corresponding non-reference HARQ process, thereby reducing signaling overhead.

Since high reliability is required for RG_reference, RG_reference is preferably transmitted at a higher transmit power level than RG_non_reference. A transmit power adjustment value (Gain_RG) for the reference HARQ process is notified by upper signaling or preset.

In accordance with the third embodiment of the present invention, a Node B transmitter and a UE receiver are substantially identical to those illustrated in FIGS. 4 and 5 in terms of configuration and operation, except for RG generation and interpretation based on the above-described rule illustrated in FIG. 7.

Embodiment 4

Figure 8:
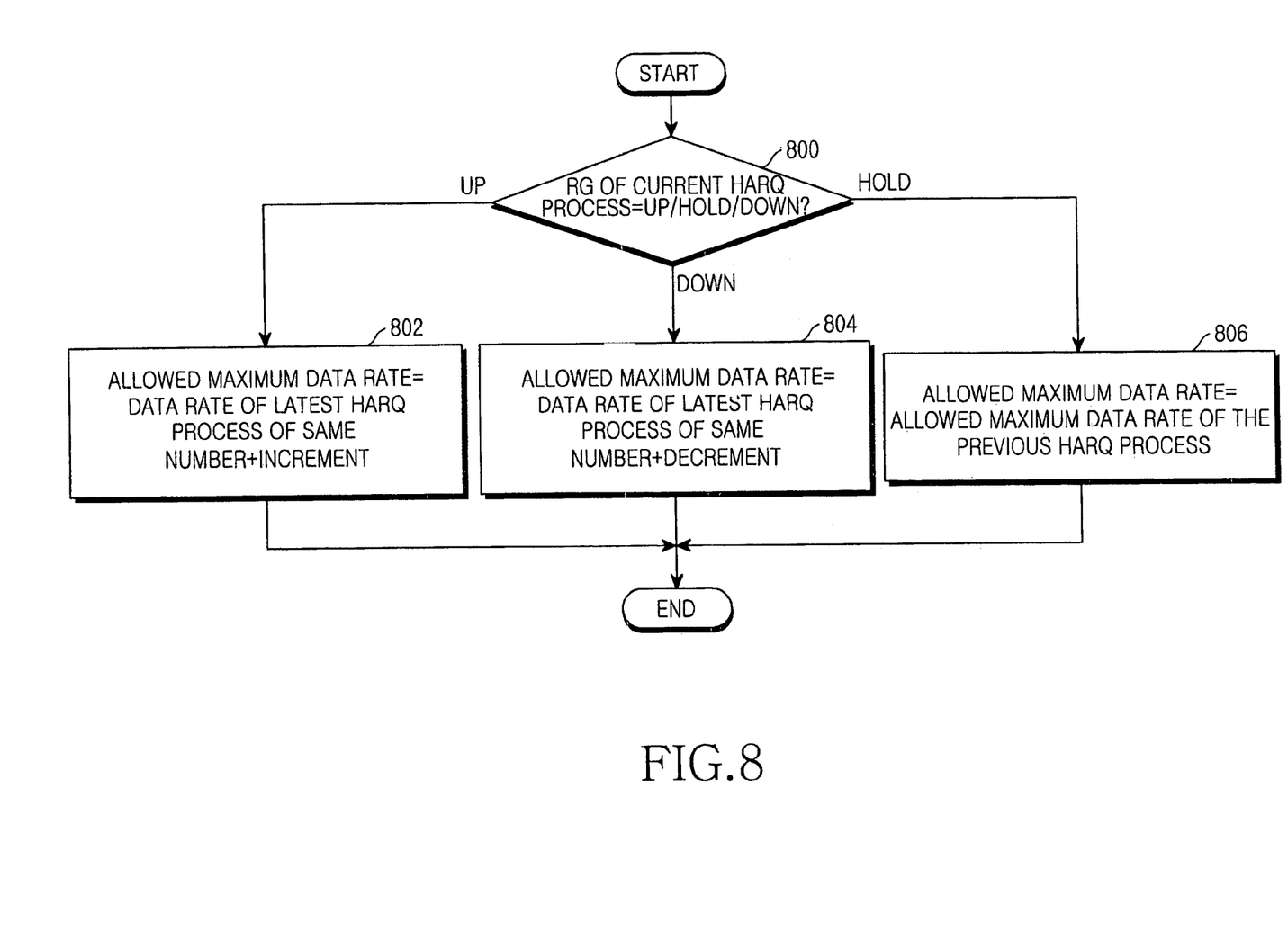
FIG. 8 is a flowchart illustrating an operation for generating and interpreting a scheduling grant according to an exemplary embodiment of the present invention.

FIG. 8 is a flowchart illustrating an operation for generating and interpreting a scheduling grant according to another exemplary embodiment of the present invention.

Referring to FIG. 8, the Node B determines which one of commands up/hold/down an RG for a current HARQ process will carry to the UE in step 800. If the RG indicates up or down, the Node B signals an RG of +1 for a rate increase or an RG of −1 for a rate decrease in the allowed maximum data rate of the UE in step 802 or step 804. This command applies with respect to the data rate of the UE used in the previous HARQ process of the same process number as that of the current HARQ process.

An increment or decrement involved in the rate increase or decrease is preset or notified by upper signaling, that is, Radio Resource Control (RRC) signaling from the RNC. Because the rate increase/no change/increase in the allowed maximum data rate of the UE are performed with respect to the data rate of the UE used in the previous HARQ process of the same process number, the Node B scheduler can manage ROT resources efficiently.

If the RG indicates hold in step 800, the Node B signals an RG of 0, that is, in the DTX mode in step 806. The RG indicating hold applies with respect to the allowed maximum data rate of the previous HARQ process to the current HARQ process. Thus, in the case where the Node B intends to allow the same allowed maximum data rate of the previous HARQ process for the current HARQ process, the downlink signaling overhead is reduced. Also, even though the UE did not transmit data in the previous HARQ process at the allowed maximum data rate, the same allowed maximum data rate can be ensured for the current HARQ process without any time delay.

The above UE operation is generalized to $$SG(k,n) = R\_used(k, n-1) + delta \quad (2)$$

$$SG(k,n) = R\_used(k, n-1) - delta \quad (3)$$

$$SG(k,n) = R\_used(k-1, n) \quad (4)$$

$$SG(0,n) = SG(k-1, n-1) \quad (5)$$

The variables in Eq. (2) to Eq. (5) are defined as follows.

k: An HARQ process number. A total of k HARQ processes from HARQ process #0 to HARQ process #(k−1) are defined.

n: A TTI count for an HARQ process. n increases by 1 every K HARQ processes.

SG(k, n): A serving grant indicating an allowed maximum data rate for a UE in an $n^{th}$ TTI for a $k^{th}$ HARQ process.

R_used(k, n): An actual data rate or power ratio of an E-DCH to a reference channel used in the $n^{th}$ TTI for the $k^{th}$ HARQ process.

Delta: An increment or decrement in a rate increase or decrease based on an RG. It is preset or notified by upper signaling.

When the UE receives SG(k, n) for the $n^{th}$ TTI of the $k^{th}$ HARQ process from the Node B, the allowed maximum data rate is determined in the following way.

If RG(k, n)=+1, it indicates up. Thus, the allowed maximum data rate is increased by delta from the data rate used in an (n−1)th TTI of the $k^{th}$ HARQ process according to Eq. (2). If RG(k, n)=−1, it indicates down. Thus, the allowed maximum data rate is decreased by delta from the data rate used in the (n−1)th TTI of the $k^{th}$ HARQ process according to Eq. (3).

If RG(k, n)=0 (that is, DTX), it indicates hold. Thus, the allowed maximum data rate depends on the HARQ process number k. If k is not 0, the allowed maximum data rate is the allowed maximum data rate of an $n^{th}$ TTI of a $(k-1)^{th}$ HARQ process according to Eq. (4). If k is 0, the allowed maximum data rate is the allowed maximum data rate of an $(n-1)^{th}$ TTI of the $(k-1)^{th}$ HARQ process according to Eq. (5).

In accordance with this embodiment of the present invention, a Node B transmitter and a UE receiver are substantially identical to those illustrated in FIGS. 4 and 5 in terms of configuration and operation, except for RG generation and interpretation based on the above-described rule illustrated in FIG. 8.

As described above, embodiments of the present invention advantageously increase efficiency in generation of an RG as a scheduling grant by which to control the data rate of a UE in a Node and in RG interpretation in the UE and reduces downlink signal overhead arising from frequent RG transmissions for E-DCH transmission to which Node B-controlled scheduling is applied.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of transmitting uplink packet data by a User Equipment (UE) including a plurality of hybrid automatic repeat request (HARQ) processes in a mobile communication system, comprising the steps of:
receiving a relative grant (RG) associated with a HARQ process from a Node B by the UE;
setting an allowed maximum power ratio of the HARQ process to the allowed maximum power ratio of an immediately previous transmission time interval (TTI) of the HARQ process by the UE, if the RG indicates hold; and
transmitting packet data within the set allowed maximum power ratio of the HARQ process to the Node B by the UE;
wherein if the RG indicates hold, the reception step comprises the step of receiving the RG from the Node B in a discontinuous transmission (DTX) mode by the UE.

2. The method of claim 1, further comprising the step of, if the RG indicates up, increasing a latest power ratio used for a previous TTI in the same HARQ process by a predetermined level and setting the increased power ratio as the allowed maximum power ratio of the HARQ process.

3. The method of claim 1, further comprising the step of, if the RG indicates down, decreases a latest power ratio used for a previous TTI in the same HARQ process by a predetermined level and setting the decreased power ratio as the allowed maximum power ratio of the HARQ process.

4. The method of claim 1, wherein the RG indicates one of a change and hold of the allowed maximum power ratio of the HARQ process.

5. The method of claim 1, further comprising the step of, if the RG indicates one of up and down, setting the allowed maximum power ratio based on a latest power ratio used for a previous TTI in the same HARQ process.

6. The method of claim 1, wherein the allowed maximum power ratio is equivalent to an allowed maximum data rate of the HARQ process in an uplink transmission.

7. The method of claim 1, wherein the RG indicates one of a change and hold in a power ratio of a physical channel carrying the uplink packet data to a reference physical channel.

8. The method of claim 1, wherein the RG is power ratio control information for uplink transmission and is mapped to +1, 0 or −1 to indicate up, hold or down of the allowed maximum power ratio.

9. A method of transmitting control information for uplink packet data reception for a User Equipment (UE) including a plurality of hybrid automatic repeat request (HARQ) processes, in a Node B of a mobile communication system, comprising the steps of:
determining an allowed maximum power ratio for a HARQ process of the UE;
setting a relative grant (RG) associated with the HARQ process to hold so that the UE sets the allowed maximum power ratio in the HARQ process to an allowed maximum power ratio of an immediately previous transmission time interval (TTI) of the HARQ process; and
transmitting the RG associated with the HARQ process to the UE by the Node B;
wherein if the RG is set to hold, the transmission step comprises the step of transmitting the RG to the UE in a discontinuous transmission (DTX) mode.

10. The method of claim 9, further comprising the step of setting the RG to up by the Node B, if the determined allowed maximum power ratio is higher than a latest allowed maximum power ratio in a previous TTI for the same HARQ process.

11. The method of claim 9, further comprising the step of setting the RG to down by the Node B, if the determined allowed maximum power ratio is lower than a latest allowed maximum power ratio in a previous TTI for the same HARQ process.

12. The method of claim 9, wherein the RG indicates one of a change and hold of the allowed maximum power ratio of the HARQ process.

13. The method of claim 9, further comprising the step of, if the RG is set to one of up and down, instructing the UE to set the allowed maximum power ratio based on a latest power ratio used for a previous TTI in the same HARQ process.

14. The method of claim 9, wherein the allowed maximum power ratio is equivalent to an allowed maximum data rate of the HARQ process in an uplink transmission.

15. The method of claim 9, wherein the RG indicates one of a change and hold in a power ratio of a physical channel carrying the uplink packet data to a reference physical channel.

16. The method of claim 8, wherein the RG is power ratio control information for uplink transmission and is mapped to +1, 0 or −1 to indicate up, hold or down of the allowed maximum power ratio.

17. An apparatus for transmitting uplink packet data in a User Equipment (UE) of a mobile communication system, the UE including a plurality of hybrid automatic repeat request (HARQ) processes, comprising:
   a receiver for receiving a relative grant (RG) associated with a HARQ process from a Node B;
   a controller for setting an allowed maximum power ratio in the HARQ process to an allowed maximum power ratio in an immediately previous transmission time interval (TTI) of the HARQ process, if the RG indicates hold; and
   a transmitter for transmitting an uplink packet data within the set allowed maximum power ratio in the HARQ process to the Node B;
   wherein if the RG indicates hold, the RG is received from the Node B in a discontinuous transmission (DTX) mode.

18. The apparatus of claim 17, wherein if the RG indicates up, the controller increases a latest power ratio used for a previous TTI in the same HARQ process by a predetermined level and sets the increased power ratio as the allowed maximum power ratio of the HARQ process.

19. The apparatus of claim 17, wherein if the RG indicates down, the controller decreases a latest power ratio used for a previous TTI in the same HARQ process by a predetermined level and sets the decreased power ratio as the allowed maximum power ratio of the HARQ process.

20. The apparatus of claim 17, wherein the RG indicates one of a change and hold of the allowed maximum power ratio of the HARQ process.

21. The apparatus of claim 17, wherein if the RG indicates one of up and down, the controller sets the allowed maximum power ratio based on a latest power ratio used for a previous TTI in the same HARQ process.

22. The apparatus of claim 17, wherein the allowed maximum power ratio is equivalent to an allowed maximum data rate of the HARQ process in an uplink transmission.

23. The apparatus of claim 17, wherein the RG indicates one of a change and hold in a power ratio of a physical channel carrying the uplink packet data to a reference physical channel.

24. The apparatus of claim 17, wherein the RG is power ratio control information for uplink transmission and is mapped to +1, 0 or −1 to indicate up, hold or down of the allowed maximum power ratio.

25. An apparatus for transmitting control information for uplink packet data reception for a User Equipment (UE) including a plurality of hybrid automatic repeat request (HARQ) processes, in a Node B of a mobile communication system, comprising:
   a controller for determining an allowed maximum data rate for a HARQ process of the UE and setting an RG associated with the HARQ process to hold, so that the UE sets the allowed maximum power ratio of the HARQ process to an allowed maximum power ratio of an immediately previous transmission time interval (TTI) of the HARQ process; and
   a transmitter for transmitting the RG to the UE;
   wherein if the RG is set to hold, the transmitter transmits a discontinuous transmission (DTX) signal to the UE.

26. The apparatus of claim 25, wherein the controller sets the RG to up, if the determined allowed maximum power ratio is higher than a latest allowed maximum power ratio in a previous TTI for the same HARQ process.

27. The apparatus of claim 25, wherein the controller sets the RG to down, if the determined allowed maximum power ratio is lower than a latest allowed maximum power ratio in a previous TTI for the same HARQ process.

28. The apparatus of claim 25, wherein the RG indicates one of a change and hold of the allowed maximum power ratio of the HARQ process.

29. The apparatus of claim 25, wherein the RG is power ratio control information for uplink transmission and is mapped to +1, 0 or −1 to indicate up, hold or down of the allowed maximum power ratio.

30. The apparatus of claim 25, wherein if the RG is set to one of up and down, the controller instructs the UE to set the allowed maximum power ratio based on a latest power ratio used for a previous TTI in the same HARQ process.

31. The apparatus of claim 25, wherein the allowed maximum power ratio is equivalent to an allowed maximum data rate of the HARQ process in an uplink transmission.

32. The apparatus of claim 25, wherein the RG indicates one of a change and hold in a power ratio of a physical channel carrying the uplink packet data to a reference physical channel.

* * * * *